United States Patent [19]
Matsuoka

[11] 3,869,111
[45] Mar. 4, 1975

[54] APPARATUS FOR MIXING RUBBER, ELASTOMER, PLASTIC AND THE LIKE

[75] Inventor: James T. Matsuoka, Brecksville, Ohio

[73] Assignee: Intercole Automation, Inc., Cleveland, Ohio

[22] Filed: Dec. 10, 1973

[21] Appl. No.: 422,984

[52] U.S. Cl. ................. 259/192, 259/191, 425/208
[51] Int. Cl. .............................................. B29f 3/02
[58] Field of Search ........... 259/191, 192, 193, 6, 7, 259/9, 10, 21, 22, 25, 26, 97; 425/207, 208; 100/146

[56] References Cited
UNITED STATES PATENTS

| | | | |
|---|---|---|---|
| 3,143,767 | 8/1964 | Wirth | 259/192 |
| 3,239,878 | 3/1966 | Ahlefeld | 259/192 |
| 3,661,363 | 5/1972 | Aletti | 259/191 |
| 3,700,374 | 10/1972 | Matsuoka | 425/208 |
| 3,802,670 | 4/1974 | Okanda | 259/192 |

*Primary Examiner*—Robert W. Jenkins
*Attorney, Agent, or Firm*—Watts, Hoffmann, Fisher & Heinke Co.

[57] ABSTRACT

Internal or closed chamber high shear processing apparatus for mixing and/or compounding rubber, elastomer, plastic and like mixes in a continuous manner and having a material processing rotor in a cylindrical material processing chamber closed except for a material feed opening adjacent one end and a material discharge opening adjacent the other end. The processing rotor has a material conveying screw section adjacent the material feed opening in the processing chamber followed by a material processing section comprising two pairs of discrete material processing banbury type blade portions offset axially with respect to one another. Both pairs of blade portions are helically oriented more lengthwise of the axis of the rotor than circumferentially thereof and twist in opposite directions. The material feed opening to the processing chamber communicates with a material feed conduit extending transversely of and in line with the processing chamber and has a material feed screw therein. A ram-type feed device is provided for stuffing material to be processed into the convolutions of the feed screw adjacent to its upstream end, that is, the end remote from the processing chamber. The material discharge opening in the processing chamber communicates with a discharge conduit offset from and extending transversely of the centerline of the processing chamber.

11 Claims, 4 Drawing Figures

APPARATUS FOR MIXING RUBBER, ELASTOMER, PLASTIC AND THE LIKE

FIELD OF INVENTION

The invention relates to enclosed high shear rotor type apparatus for mixing and/or compounding rubber, elastomer, plastic and the like mixes.

PRIOR ART

Apparatus for mixing and/or otherwise processing rubber and like material mixes within a closed chamber by the action of parallel high shear or banbury type rotors are known.

Typical prior art U.S. Pat. Nos. of this character are, Ahlefeld, Jr. et al., 3,239,873 and Matsuoka et al., 3,700,374.

SUMMARY OF THE INVENTION

The present invention provides a novel and continuous improved internal or closed chamber high shear apparatus for mixing and/or compounding rubber, elastomer, plastic and like mixes comprising a material processing rotor in a cylindrical processing chamber closed except for a material feed opening adjacent one end and a material discharge opening adjacent the other end. The processing rotor has banbury type material processing blade portions, preferably preceded by a material feed screw section. Material is fed to the processing chamber by a feed screw, the axis of which is transverse to and intersects the axis of the processing rotor. A ram-type feed device is provided for stuffing material into the convolutions of the feed screw adjacent its upstream end. Material is discharged from the mixing chamber through the discharge opening adjacent the downstream end of the mixing chamber through a discharge conduit, the axis of which is offset from and transverse with respect to the axis of the processing rotor. A discharge screw in the discharge conduit controls the rate of movement of material being processed through the apparatus.

More specifically, the present invention provides a novel and improved internal or closed chamber high shear continuous material mixing apparatus of the character referred to intended primarily to be used as a supplemental material mixer and/or warm-up facilities in a rubber or plastic factory.

The invention will be better understood and further advantages, as well as objects thereof, will be apparent from the accompanying drawings and the ensuing description of the preferred embodiment of the invention.

DESCRIPTION OF THE PREFERRED EMBODIMENT

Figure 1:
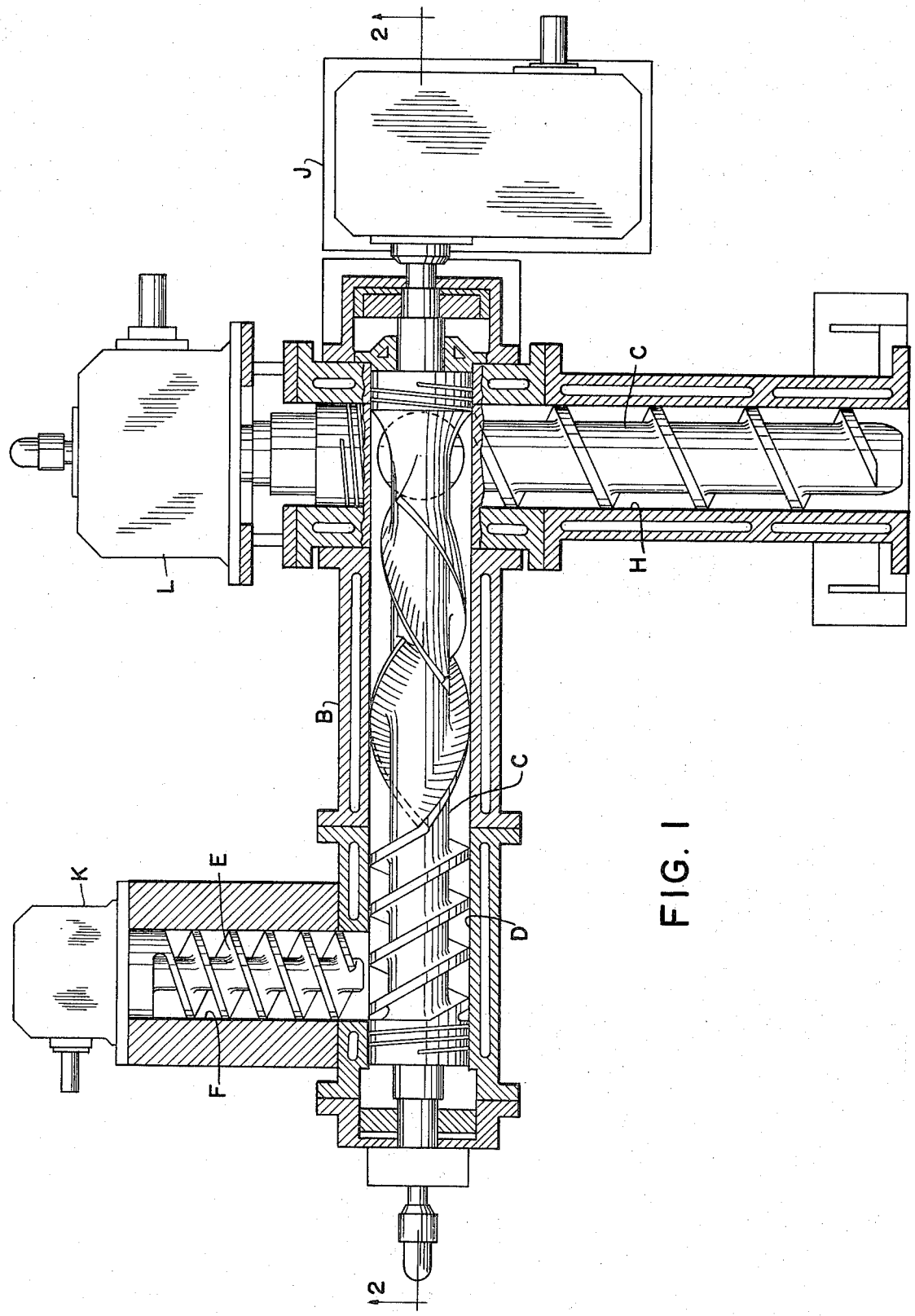
FIG. 1 is a sectional view with portions in elevation approximately on the line 1—1 of FIG. 2 of apparatus embodying the present invention.
Figure 4:
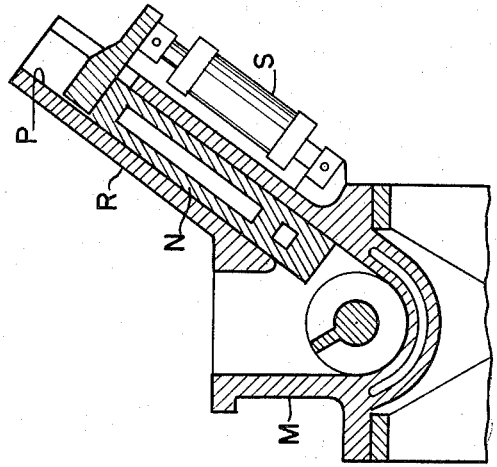
FIG. 4 is a sectional view approximately on the line 4—4 of FIG. 3 with portions in elevation.
Figure 3:
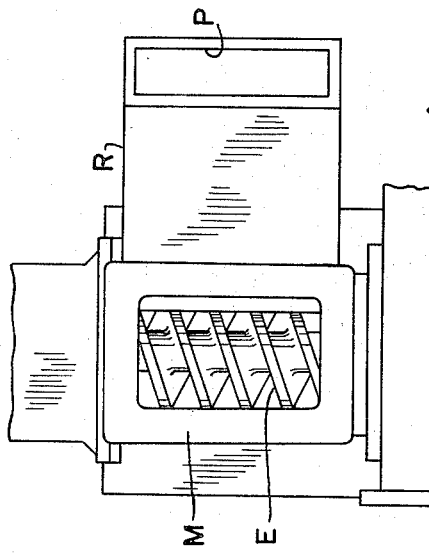
FIG. 3 is a fragmentary plan view of the apparatus shown in FIGS. 1 and 2.
Figure 2:
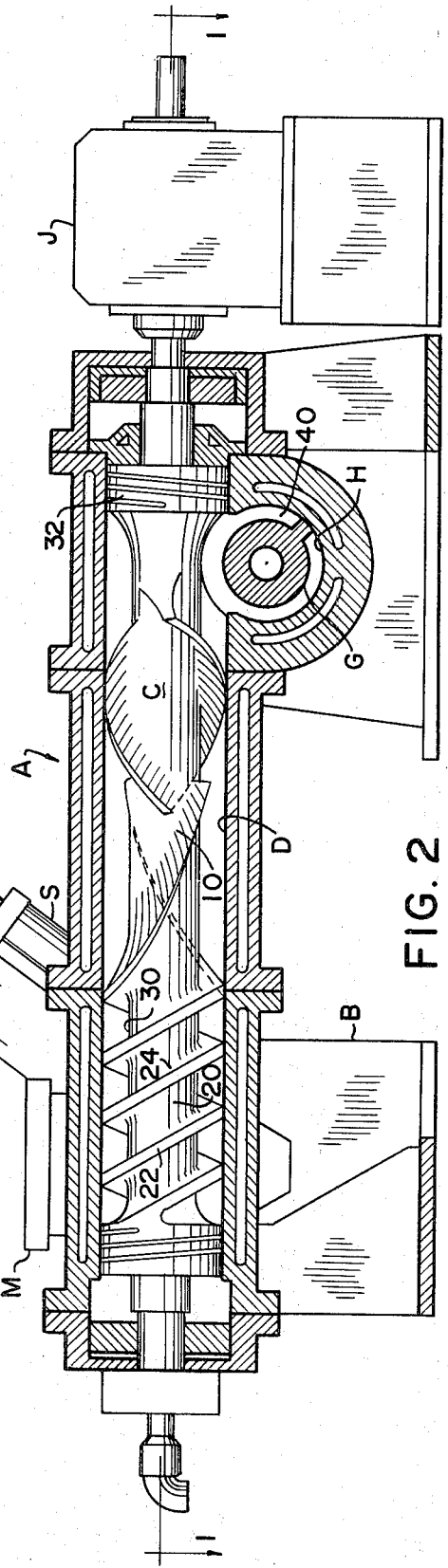
FIG. 2 is a sectional view with portions in elevation approximately on the line 2—2 of FIG. 1.

The preferred embodiment of the invention is a stiff gel material processing apparatus indicated generally by the reference character A and through which material being processed moves continuously. The apparatus comprises a built-up frame B rotatably supporting a material processing rotor C in a tubular cylindrical processing chamber D; a feed screw E in a cylindrical tubular feed conduit F communicating with the in feed end of the processing chamber D; and a discharge screw G in a discharge conduit communicating with the discharge end of the processing chamber D adjacent the end thereof opposite from the feed conduit F. In the embodiment shown the discharge screw G is of the extruder screw type. The rotor C, feed screw E and discharge screw G are rotated through gear reductions J, K, L, respectively, connected to suitable drive motors. The frame B further provides a material feed hopper M communicating with the end of the feed conduit E adjacent the end thereof remote from the processing chamber D for the introduction of material to be processed into the feed screw E. Provision is made for stuffing material in the feed hopper M into the convolutions of the feed screw E in the form of a ram N reciprocally supported in an aperture P in an extension R of the frame B by the fluid operated reciprocating type double acting motor S.

The rotor C has a material processing section 10 provided with two pairs of banbury type blade portions 12, 14 and 16, 18, respectively preceded by a double thread material conveying screw section 20 having two helical screw threads 22, 24. The mixing blade portions 12, 14 of rotor C have convex leading sides, are equal in length and curve or twist about the rotor body, preferably helically, through about 10° to 195° at right-hand helix or lead angles of about 50° to 80°, that is, at about 10° to 40° to the axis of the rotor. The other pair of mixing blade portions 16, 18 also have convex leading sides, and are of equal length but shorter than the blade portions 12, 14. The blade portions 16, 18 also curve or twist about the rotor body, preferably helically through about 10° to 195° but at left-hand helix or lead angles preferably 10° to 70° less than that of the other pair.

Beginning at or approximately at the upstream end of the aperture 28 adjacent the discharge end of the processing chamber D by the intersection therewith of the discharge conduit H, the mixing blade portions 16, 18 merge or feather into the cylindrical body portion 30 of the rotor on a radius slightly larger than that of the conduit H in which the discharge screw G rotates. The radius is such that it is tangent with the exterior of the rotor body portion at or approximately at the plane of the vertical center line of the discharge screw. From the plane of the vertical center line of the discharge screw, the diameter of the cylindrical rotor body portion increases on the aforementioned radius to the end of the chamber D where it terminates at the cylindrical section 32 of the rotor. The adjoining ends of the pairs of blade portions 12, 14 and 16, 18 of rotor C are preferably displaced angularly of the axis of rotation of the rotor from one another about 90°. This, however, is not necessary as the adjacent ends of the adjoining blades could connect with one another.

The angular displacement of the adjacent or inner ends of the respective pairs of blade portions of the rotors shown provide gaps through which material being mixed can back flow for remixing. The gaps extend radially inward to a depth that approximately corresponds to the periphery of the body portion of the rotor. The body portion 30 of the rotor is generally cylindrical, preferably with a slight increase in diameter from the center of the bladed section to the infeed end thereof.

The respective blade portions 12, 14 and 16, 18 of each pair are as previously stated preferably of equal length and are located 180° from one another and twist in the same direction with their trailing ends adjacent one another. The adjoining ends of the pairs of blade portions 12, 14 and 16, 18 of rotor C are preferably displaced angularly of the axis of rotation of the rotor from one another about 90°. This, however, is not necessary as the adjacent ends of the adjoining blades could connect with one another.

The axis of the discharge screw G is in a vertical plane normal to the axes of rotor C and is offset below the rotor C such that the thread 40 of the discharge screw just clears the cylinder body portion 30 of the rotor. In the preferred embodiment of the invention shown the height of the mixing rotor blades or, in other words, the radial projection from the body portion 30 of the rotor, is approximately one-fifth the maximum diameter of the bladed portions of the rotor in the mixing chamber with the result that part of the thread 40 at the upstream end of the control screw G extends into the lower part of the portion of the cylindrical processing chamber with the result that material being processed is transferred directly from the discharge end of the processing chamber C directly to the upstream end of the discharge conduit H and the discharge control screw upstream end of the feed screw E. If the nature of the material is such that it will not readily enter the feed screw it can be stuffed or forced into the screw by the plunger N. The feed screw conveys the material to the infeed section of the rotor C which is driven, as is the feed screw E, at a suitable speed as by the variable speed motor. The threads 22, 24 on the rotor C convey the material to the mixing section of the rotor. As previously suggested, the infeed screw section 20 of the rotor may be omitted and the material introduced directly into the upstream end of the processing section of the chamber D as by moving the feed screw E downstream and/or extending the upstream mixing blade portions to the left, as viewed in the drawings. As the material moves into and through the processing chamber, the blades of the mixing section of the rotor work the material within the mixing chamber in a generally back and forth manner by virtue of the oppositely twisting blade portions on the rotor. In addition, the blade portions of the rotor due to their high helix or lead angles spread the material within the mixing chamber against the inside surface thereof and shear the material between the blade portions and the mixing chamber wall. The material is also sheared between the rotor blade portions. The peripherally displaced inner ends of the blade portions of the rotor of the preferred embodiment permits a limited flow of material through the gaps between the inner or adjacent ends of the blade portions so that the material will in part flow in a tortuous mixing path as it is worked by the blade portions of the rotor.

Material being processed progressively becomes a stiff homogenized gelatinous mass decreasing in viscosity towards the discharge end of the apparatus. Its movement through the processing chamber C is in part effected by the mixing blades in the upstream end of the chamber D exerting pressure thereon through the more viscous material in the entrance end of the mixing chamber C and by the pull or drag thereon effected by the discharge screw G. Lengthening the mixing blades at the entrance end of the mixing chamber relative to the blades at the discharge end enhances the flow-through pressure exerted on the material being processed by the rotor mixing blades. In the chamber R the material being processed may be further worked by the control screw threads depending upon the construction of the screw.

The mixing process produces heat and the temperature in the various parts of the apparatus can be controlled by the circulation of heat transfer fluid through various passages in the frame structure which are closely adjacent the inside walls or surfaces of the processing chamber, feed and discharge conduits, etc., as already mentioned. The independent control of supply and exhaust of heat transfer fluid to the various chambers, conduits, etc., permits maximum temperature control and flexibility to establish the required temperature at different locations within the apparatus. The fact that the material being processed is directly transferred from the rotor C to the discharge screw G without any intervening conduit between the processing chamber and the discharge conduit provided optimum temperature control over the material being processed and facilitates movement of the material through the apparatus.

As described above, an apparatus having a material processing rotor and a screw controlled discharge has been provided in which the material throughout is affected by operation of a screw in a discharge conduit which conduit is directly in communication with or connected to the material processing chamber. In the event that the outfeed or control screw is an extruder screw, it can be designed to further process or mix the material being processed in addition to the blades of the rotor C. The construction of the frame B and the various sub-frame assemblies such as the rotor bearing assemblies, etc. have not been described in detail, as such constructions do not per se form a part of the present invention.

From the foregoing description of the preferred embodiment it will be apparent that the objects heretofore enumerated and others have been accomplished and that there has been provided a novel and improved apparatus for continuously processing rubber, elastomer, plastic and the like material mixes.

Having thus described by invention, I claim:

1. In apparatus for processing materials including solid ingredients which become gelatinous at above ambient temperature, such as rubbers, elastomers, plastics and like mixes: structure forming a cylindrical tubular material processing chamber having a discharge opening adjacent to one end thereof; a rotor supported for rotation in said chamber and having material processing blade portions with convex leading sides, orientated more lengthwise of the axis of the rotor than circumferentially thereof and twisting in opposite directions with the ends thereof adjacent one another trailing; means for rotating said rotor; said structure also forming a material feed conduit communicating with said chamber adjacent the end thereof opposite said discharge opening and extending transversely of said chamber; a material feed screw supported for rotation in said feed conduit; means to rotate said feed screw; said structure also forming a hopper opening into said feed conduit; said structure forming said chamber and said conduit having passageways therein for the circulation of heat exchange medium in the walls thereof.

2. In apparatus for processing materials including solid ingredients which become gelatinous at above ambient temperature, such as rubbers, elastomers, plastics, and like mixes: structure forming a cylindrical tubular material processing chamber; a rotor supported for rotation in said chamber and having a material processing blade portions with convex leading sides, orientated more lengthwise of the axis of the rotor than circumferentially thereof and twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; said structure further forming a material discharge conduit communicating with said chamber adjacent the end thereof remote from said feed conduit and extending transversely of said chamber; a material discharge screw supported for rotation in said discharge conduit; and means to rotate said discharge screw; said structure forming said chamber and said conduits having passageways therein for the circulation of heat exchange medium closely adjacent the interior walls of said chamber and said conduits.

3. In apparatus for processing materials including solid ingredients which become gelatinous at above ambient temperature, such as rubbers, elastomers, plastics, and like mixes: structure forming a cylindrical tubular material processing chamber having a discharge opening adjacent to one end thereof; a rotor supported for rotation in said chamber and having a material conveying screw section followed by a material processing section comprising a pair of axially arranged blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with said chamber adjacent the end thereof opposite said discharge opening and extending transversely thereof; a material feed screw supported for rotation in said feed conduit; means to rotate said feed screw; said structure also forming a hopper opening into said feed conduit; and said structure forming said chamber and said conduits having passageways therein for the circulation of heat exchange medium in the walls thereof.

4. In apparatus for processing materials including solid ingredients which become gelatinous at above ambient temperature, such as rubbers, elastomers, plastics and like mixes: structure forming a cylindrical tubular material processing chamber; a rotor supported for rotation in said chamber and having a material conveying screw section followed by a material processing section comprising a pair of axially arranged blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; said structure further forming a material discharge conduit communicating with said chamber adjacent the end thereof remote from said feed conduit and extending transversely of said chamber; a material discharge screw supported for rotation in said discharge conduit; and means to rotate said discharge screw; said structure forming said chamber and said conduits having passageways therein for the circulation of heat exchange medium closely adjacent the interior walls of said chamber and said conduits.

5. In apparatus for processing materials including solid ingredients which become gelatinous at above ambient temperature, such as rubbers, elastomers, plastics and like mixes: structure forming a cylindrical tubular material processing chamber; a rotor supported for rotation in said chamber and having material processing blade portions with convex leading sides, orientated more lengthwise of the axis of the rotor than circumferentially thereof and twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopped opening into said feed conduit; said structure further forming a material discharge conduit intersecting the bottom portion of said chamber adjacent the end thereof remote from said feed conduit and extending transversely of said chamber; a material discharge screw supported for rotation in said discharge conduit with its axis offset below the axis of said rotor and with a portion of its thread extending into said chamber; and means to rotate said discharge screw; said structure forming said chamber and said conduits having passageways therein for the circulation of heat exchange medium closely adjacent the interior walls of said chamber and said conduits.

6. In apparatus for processing materials including solid ingredients which become gelatinous at above ambient temperature, such as rubbers, elastomers, plastics and like mixes; structure forming a cylindrical tubular material processing chamber having a discharge opening adjacent one end thereof; a rotor supported for rotation in said chamber and having material processing blade portions with convex leading sides, orientated more lengthwise of the axis of the rotor than circumferentially thereof and twisting in opposite directions with the ends thereof adjacent one another trailing; means for rotating said rotor; said structure also forming a material feed conduit communicating with said chamber adjacent the end thereof opposite said discharge opening and extending transversely thereof; a material feed screw supported for rotation in said feed conduit; means to rotate said feed screw; said structure also forming a hopper opening into said feed conduit; a ram reciprocable in said hopper for stuffing material to be processed into said feed screw means for reciprocating said ram; said structure forming said chamber and said conduits having passageways therein for the circulation of heat exchange medium closely adjacent the interior walls of said chamber and said conduits.

7. In apparatus for processing materials including solid ingredients which become gelatinous at above ambient temperature, such as rubbers, elastomers, plastics, and like mixes: structure forming a cylindrical tubular material processing chamber; a rotor supported for rotation in said chamber and having material processing blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; a ram reciprocable in said hopper for stuffing material to be processed into said feed screw means for reciprocating said ram; said structure further forming a material discharge conduit communicating with said chamber adjacent the end thereof remote from said feed conduit and extending transversely of said chamber; a material discharge screw supported for rotation in said discharge conduit; and means to rotate said discharge screw; said structure forming said chamber and said conduits having passageways therein for the circulation of heat exchange medium closely adjacent the interior walls of said chamber and said conduits.

8. In apparatus for processing materials including solid ingredients which become gelatinous at above ambient temperature, such as rubbers, elastomers, plastics and like mixes: structure forming a cylindrical tubular material processing chamber having a discharge opening adjacent to one end thereof; a rotor supported for rotation in said chamber and having a material conveying screw section followed by a material processing section comprising a pair of axially arranged blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with said chamber adjacent the end thereof opposite said discharge opening and extending transversely thereof; a material feed screw supported for rotation in said feed conduit; means to rotate said feed screw; said structure also forming a hopper opening into said feed conduit; and a ram reciprocable in said hopper for stuffing material to be processed into said feed means for reciprocating said ram; said structure forming said chamber and said conduits having passageways therein for the circulation of heat exchange medium in the walls thereof.

9. In apparatus for processing materials including solid ingredients which become gelatinous at above ambient temperature, such as rubbers, elastomers, plastics and like mixes: structure forming a cylindrical tubular material processing chamber; a rotor supported for rotation in said chamber and having a material conveying screw section followed by a material processing section comprising a pair of axially arranged blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; a ram reciprocable in said hopper for stuffing material to be processed into said feed screw means for reciprocating said ram; said structure further forming a material discharge conduit communicating with said chamber adjacent the end thereof remote from said feed conduit and extending transversely of said chamber; a material discharge screw supported for rotation in said discharge conduit; and means to rotate said discharge screw; said structure forming said chamber and said conduits having passageways therein for the circulation of heat exchange medium closely adjacent the interior walls of said chamber and said conduits.

10. In apparatus for processing materials including solid ingredients which become gelatinous at above ambient temperature, such as rubbers, elastomers, plastics and like mixes; structure forming a cylindrical tubular material processing chamber; a rotor supported for rotation in said chamber and having material processing blade portions with convex leading sides, orientated more lengthwise of the axis of the rotor than circumferentially thereof and twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; a ram reciprocable in said hopper for stuffing material to be processed into said feed screw means for reciprocating said ram; said structure further forming a material discharge conduit intersecting the bottom portion of said chamber adjacent the end thereof remote from said feed conduit and extending transversely of said chamber; a material discharge screw supported for rotation in said discharge conduit with its axis offset below the axis of said rotor and with a portion of its thread extending into said chamber; and means to rotate said discharge screw; said structure forming said chamber and said conduits having passageways therein for the circulation of heat exchange medium closely adjacent the interior walls of said chamber and said conduits.

11. In apparatus for processing materials including solid ingredients which become gelatinous at above ambient temperature, such as rubbers, elastomers, plastics and like mixes: structure forming a cylindrical tubular material processing chamber; a rotor supported for rotation in said chamber and having a material conveying screw section followed by a material processing section comprising a pair of axially arranged blade portions with convex leading sides, orientated more lengthwise of the axis of the rotor than circumferentially thereof and each pair twisting in opposite directions with the ends thereof adjacent one another trailing; means for rotating said rotor; said structure also forming a material feed conduit communicating with one end of said chamber and extending transversely thereof; a material feed screw supported for rotation in said feed conduit; means to rotate said feed screw; said structure also forming a hopper opening into said feed conduit; a ram reciprocable in said hopper for stuffing material to be processed into said feed screw means for reciprocating said ram; said structure further forming a material discharge conduit intersecting the bottom portion of said chamber adjacent the end thereof remote from said feed conduit and extending transversely of said chamber; a material discharge screw supported for rotation in said discharge conduit with its axis offset below the axis of said rotor and with a portion of its thread extending into said chamber; and means to rotate said discharge screw; said structure forming said chamber and said conduits having passageways therein for the circulation of heat exchange medium closely adjacent the interior walls of said chamber and said conduits.

* * * * *